United States Patent

[11] 3,592,429

[72] Inventors Robert Eric Miller
2 Ian Street, Rose Bay, New South Wales;
Eric Miller, 1 Wharf Road, Vaucluse, New South Wales, both of, Australia
[21] Appl. No. 812,531
[22] Filed Mar. 5, 1969
[45] Patented July 13, 1971
[32] Priority Mar. 6, 1968
[33] Australia
[31] 34644/68

[54] GIMBAL MOUNTING FOR INSTRUMENTS AND MACHINES
4 Claims, 5 Drawing Figs.
[52] U.S. Cl................................................... 248/179,
95/86, 248/183
[51] Int. Cl.................................................F16m 11/12
[50] Field of Search........................................ 248/179,
178, 177, 176, 182, 183, 184, 181; 95/86; 33/61,
174 TD, 72, 61

[56] References Cited
UNITED STATES PATENTS
2,293,207  8/1942  Haskin et al. .................. 248/183
2,354,515  7/1944  Greenwood .................. 248/183
2,459,040  1/1949  Miller ........................... 248/183
2,882,001  4/1959  Ries et al. ..................... 248/183
3,064,547  11/1962 Humphries .................... 95/86
3,123,330  3/1964  Forbes-Robinson ........ 248/183
3,206,853  9/1965  Harvo Esumi .............. 248/181
3,353,776  11/1967 Clemens....................... 248/183

FOREIGN PATENTS
79,889     1950   Czechoslovakia............ 248/181
1,274,350  8/1968  Germany...................... 248/183
456,354    4/1959  Italy ............................. 95/86

Primary Examiner—Marion Parsons, Jr.
Attorneys—Emory L. Groff and Emory L. Groff, Jr.

ABSTRACT: A gimbal mounting for instruments used on unstable bases such as aircraft, boats or vehicles includes a U-shaped base mounted on a support and a U-shaped cradle swingably mounted on the base. The base mounting comprises two interconnected units disposed one above the other each including pistons rotatably mounted in liquid filled cylinders, the longitudinal axes of the pistons being coplanar and at right angles to each other. The lowermost of the two units is coupled to a support such as a tripod, whereas the uppermost unit is secured to the underface of the base bottom. Exteriorly adjustable brake means are disposed within the cylinders for engagement on the peripheries of the pistons.

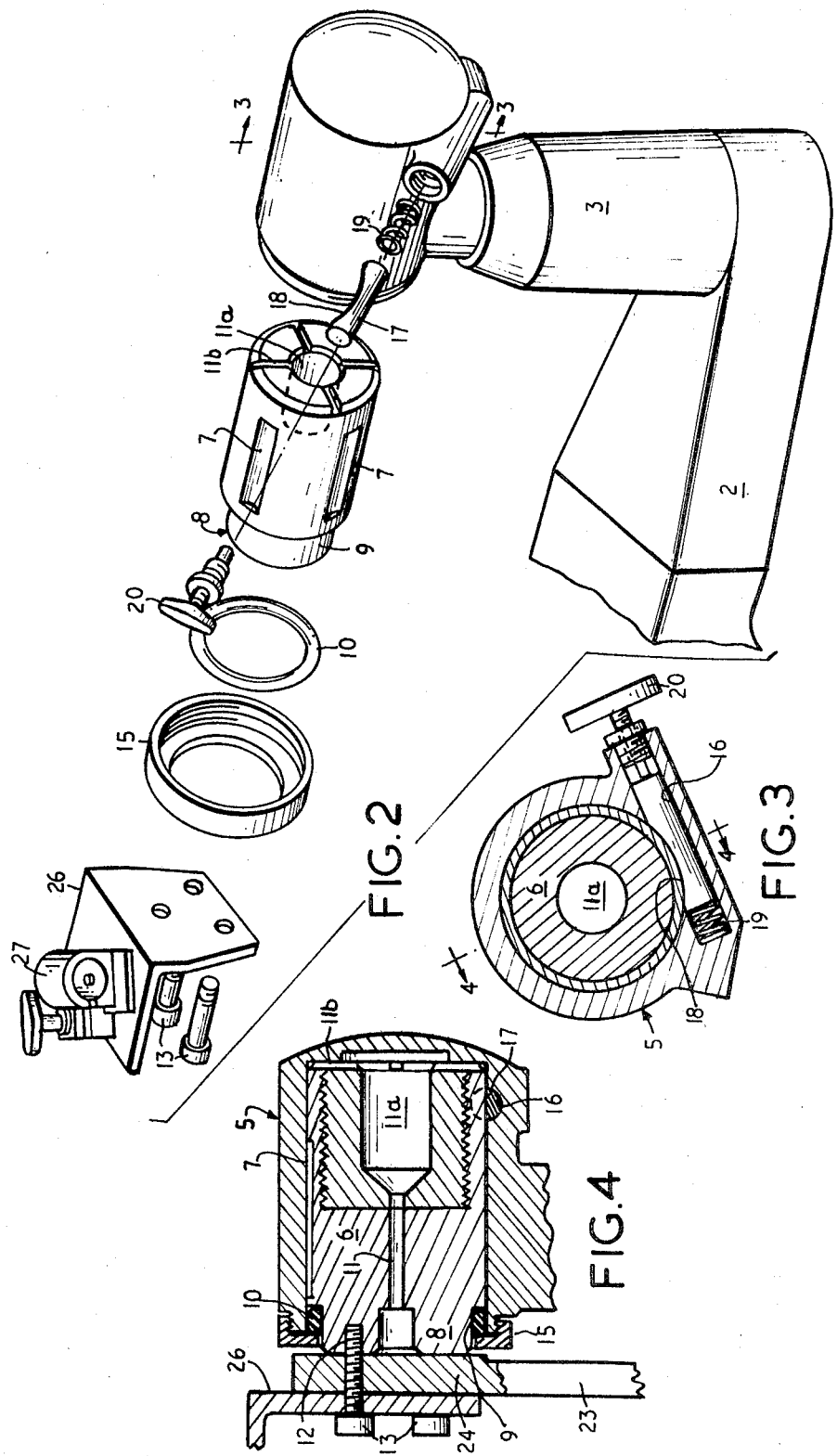

3,592,429

GIMBAL MOUNTING FOR INSTRUMENTS AND MACHINES

This invention has been devised to provide a gimbal mounting for instruments and machines which have to be optically aligned with an object and maintained vibration free during movement in the gimbal irrespective of movement of the carrier on which the gimbal is supported. While not limited thereto, the gimbal mounting of this invention is particularly useful when supported on a tripod or other carrier such as aircraft, vessels and vehicles.

This gimbal mounting comprises a U-shaped base mounted on a support and a U-shaped cradle swingably mounted on said base, said base mounting comprising two conjoined units, one said unit having one part rotatable relative to another part about a horizontal axis, said rotatable part being fixed to said base, said other unit having the conjoined part rotatable relative to its other part about a vertical axis, said other part having means for fixing to a carrier, each mounting means comprising a rotatable piston in a cylinder charged with a lubricant and at least one brake unit adapted to engage each piston.

The invention is described in detail with reference to the accompanying drawings wherein:

FIG. 2 is an exploded fragmentary perspective view of one connection of the cradle to the base, FIG. 3 is a section on line 3-3 of FIG. 2, FIG. 4 is a section on line 4-4 of FIG. 3.

Figure 1:
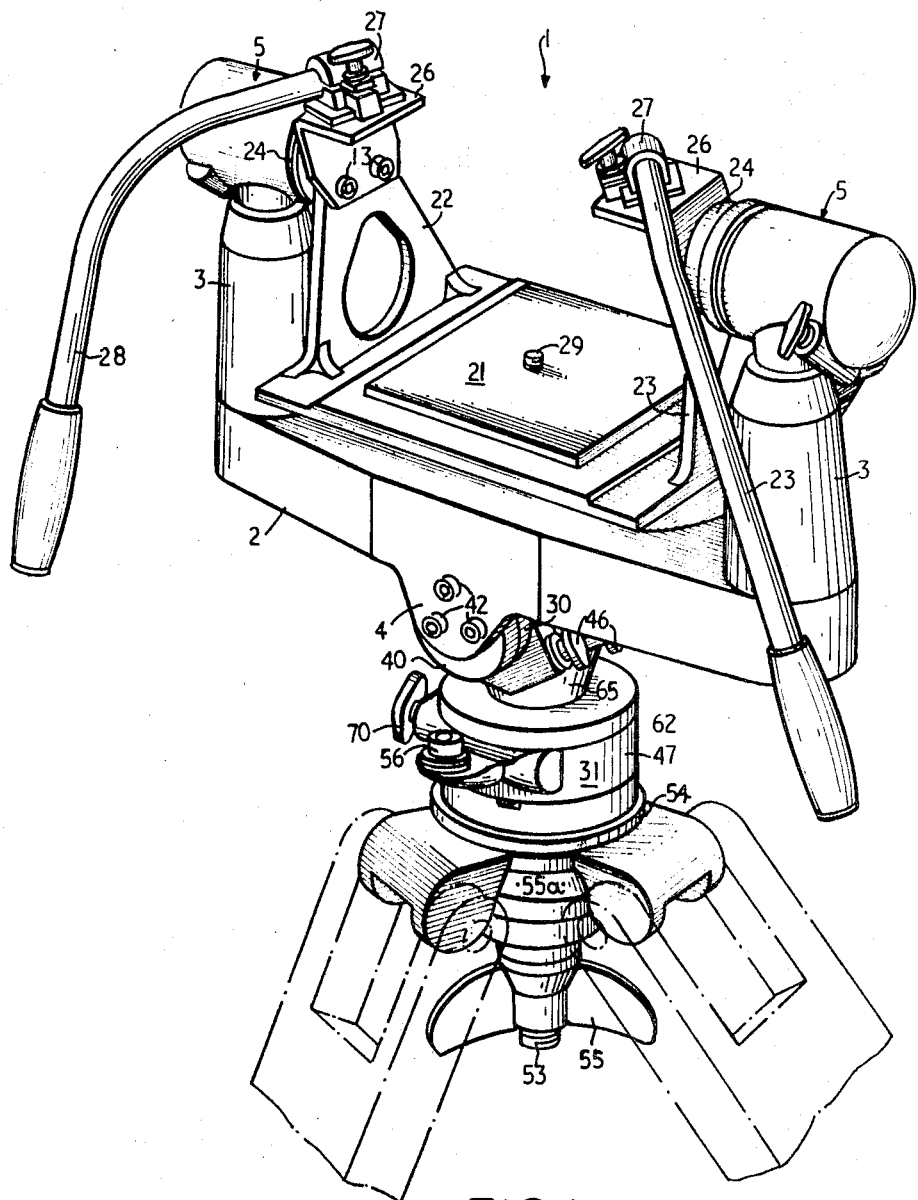
FIG. 1 is a perspective view of the gimbal mounting fixed to a tripod.
Figure 5:
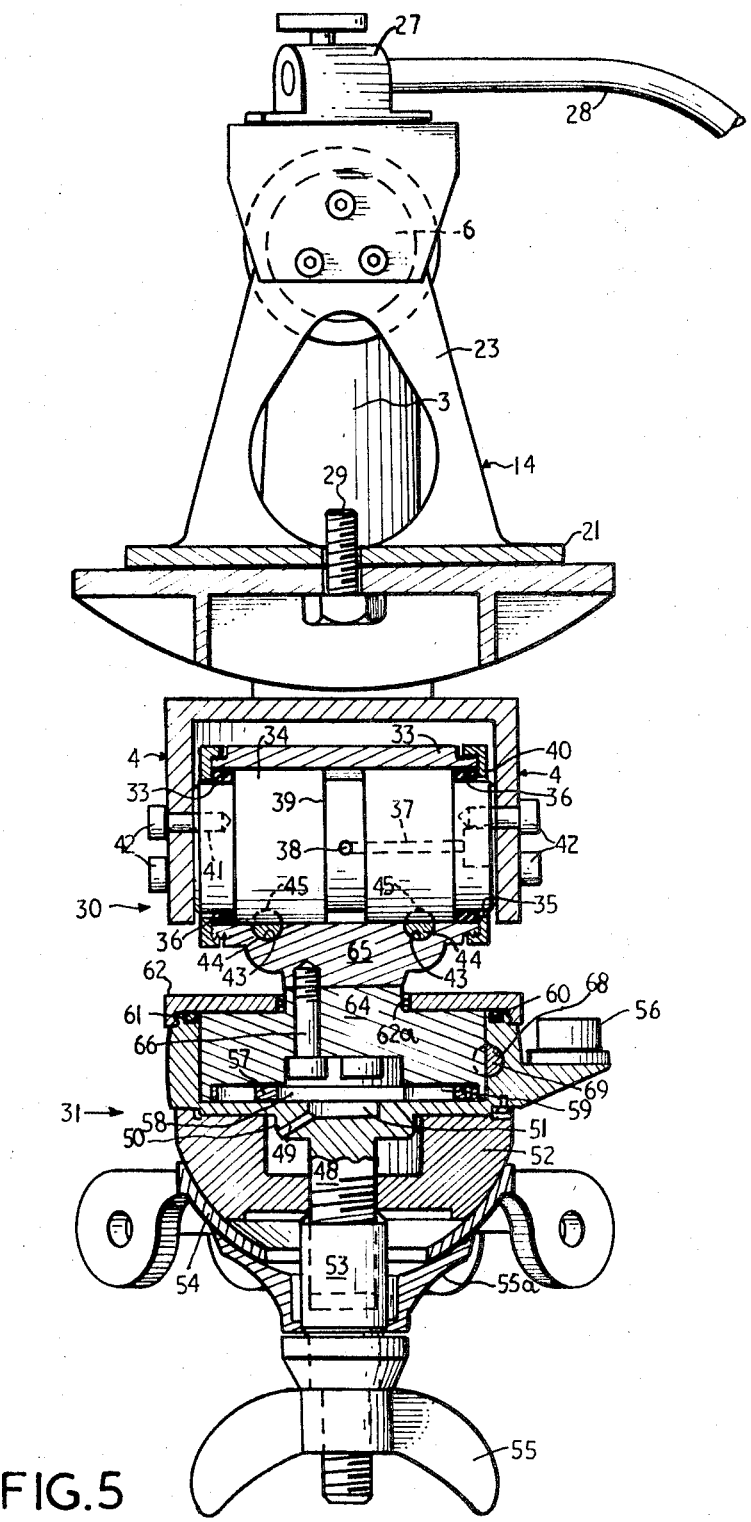
FIG. 5 is a medial sectional elevation of the gimbal mounting illustrated in FIG. 1.

The base 1 comprises a bottom 2, upstanding limbs 3 and lugs 4 projecting from the underface of the bottom 2. On the free end of each limb 3 is mounted a cylinder 5 with a neat fitting piston 6 therein. The piston 6 has three evenly spaced shallow recesses 7 on its periphery. The recesses 7 do not extend the full length of the piston 6, they serve as liquid retainers. The outer end 8 of each piston is reduced in diameter as at 9 and an "O"-ring 10 is mounted on the reduced end 9. A liquid lubricant charging and pressure relief port 11 extends axially through the piston 6 terminating in a liquid reservoir 11a from which liquid is distributed through radial channels 11b to the periphery of the piston 6. In the outer end 8 of each piston there are threaded holes 12 to take three screws 13 whereby the cradle 14 is swingably mounted on the base 1. Each piston 6 is retained in its respective cylinder 5 by a ring cap 15 and the reduced piston end 9 projects through the cap 15.

The wall of each cylinder 5 is bored as at 16 to intersect partly with the bore of the cylinder 5. A cylindrical brake block 17 having an arcuate cutout 18 is slidably mounted in the bore 16 between a spring 19 and a brake actuating thumbscrew 20.

The cradle 14 comprises a mounting plate 21 with two upstanding arms 22 and 23 at the free ends of which are mounting bosses 24 which have holes 25 to receive the screws 13 whereby the bosses 24 are fixed to the respective piston ends 8. The screws 13 also support angle brackets 26 on each of which is a clamp socket 27 in which an end of an operating handle 28 is secured. The mounting plate 21 is provided with an instrument fixing screw 29.

Two conjoined units 30 and 31 support the base 1 on a carrier, which as illustrated is a tripod 32. The unit 30 comprises an open ended cylinder 33 in which is rotatably mounted a neat fitting piston 34 each end of which is reduced in diameter as at 35 and an "O"-ring 36 is mounted on each reduced diameter 35. A liquid charging and pressure relief port 37 extends from one end of the piston 34 axially to a diametric port 38 opening into a peripheral groove 39 in the piston. The piston 34 is retained in the cylinder 33 by two ring caps 40 screwed onto the cylinder 33, the reduced diameter ends 35 of the piston 34 project through the caps 40 and are provided with three screwed holes 41 to take screws 42 whereby the base lugs 4 are fixed to the piston 34.

The wall of the cylinder 33 is bored at two places as at 43, these bores partly intersect with the bore of the cylinder 33. A cylindrical brake block 44 having an arcuate cutout 45 is slidably mounted in each bore 43 between a spring and a brake actuating thumbscrew 46 as previously described with reference to FIGS. 2 and 3.

The unit 31 comprises a cylinder 47 open at one end and having an axial threaded spigot 48 projecting from its closed end. A liquid charging and pressure relief port 49 extends between an external shoulder 50 and a liquid reservoir 51 in the cylinder closed end. A part spherical member 52 is clamped against the exterior surface of the closed end of the cylinder 47 by a coupling bolt 53 and a part spherical socket head 54 of the tripod stand 32 is clamped on the member 52 by a wingnut 55 and clamp cup 55a screwed onto the coupling bolt 53. A spirit level 56 is mounted on the exterior of the cylinder 47 and by means of the mating part spherical members 52 and 54, which constitutes a ball and socket type connector, and the wingnut 55 and cup 55a, the cylinder 47 can be set level.

A liquid distributing and thrust absorbing plate 57 is positioned in the bore of the cylinder 47 and rests upon the inner face of closed cylinder end. The plate 57 has a central hole 58 which surrounds the liquid reservoir 51 and a number of radiating oil distributing cutouts 59. The open end of the cylinder 47 is recessed to receive an "O"-ring seal 60 and is threaded as at 61 to take a ring cap 62. A piston 63 having a reduced diameter end 64 which projects neatly through an "O"-ring sealed hole 62a in the cap 62 is secured to a boss 65 on the cylinder 33 by means of screws 66. The piston other end is counterbored as at 67 to accommodate the plate 57.

The wall of the cylinder 47 is bored as at 68 to intersect partly with the bore of the cylinder 47. A cylindrical brake block 69 as hereinbefore described slidably mounted in the bore 68 between a spring and a thumbscrew 70 in the same manner as that described with reference to FIGS. 2 and 3.

The ports 11, 37 and 49 incorporates sealing means (not shown).

We claim:

1. A gimbal mounting comprising a U-shaped base having a bottom and two upwardly extending legs, a U-shaped cradle having a bottom and two upwardly extending legs, means connecting the base legs to the cradle legs to swingably support the cradle in the base, a first cylindrical piston means mounted on the underface of the base bottom and spaced therefrom with the longitudinal axis of the piston means at right angles to the axis of swing of the cradle, a first cylinder encircling the first piston, a second cylindrical piston means fixed by one end to the first cylinder, the longitudinal axes of the first and second piston means being coplanar and at right angles to each other, a second cylinder encircling the second piston means and coupling means for mounting the gimbal on a support structure, said piston means being rotatably mounted in their respective cylinders, said cylinders being filled with a liquid of predetermined viscosity and incorporating sealing means to prevent the escape of said liquid.

2. A gimbal mounting comprising a U-shaped base having a bottom part and upwardly extending legs, first and second tubular cylinders with closed outer ends respectively fixed to the upper ends of the U base legs with the axes of the cylinders mutually aligned, a U-shaped cradle having a bottom adapted to receive apparatus to be mounted on the gimbal and two upwardly extending legs, first and second outwardly extending cylindrical pistons respectively fixed to the cradle legs with each piston rotatably supported in one of the cylinders, liquid of predetermined viscosity in said cylinders, means sealing the pistons in the cylinders to prevent the escape of said liquid, exteriorly adjustable brake means disposed within said cylinders for engagement on the peripheries of said pistons, two downwardly extending piston support legs fixed to the underface of the base bottom, a third cylindrical piston fixed by its ends to the support legs, the common axis of rotation of said first and second pistons and the axis of rotation of the third piston being disposed at right angles to each other, a tubular third cylinder around said third piston, liquid of predetermined viscosity in the third cylinder, means at each end of the third cylinder to seal the third piston in the third cylinder to prevent the escape of said liquid, exteriorly adjustable brake means disposed within said third cylinder for engagement with the third piston, downwardly extending support means on the third cylinder, a fourth cylindrical piston fixed by one end to the support means the longitudinal axes of the third and fourth pistons being coplanar and at right angles to each other, a fourth cylinder with one end closed for supporting said fourth piston, liquid of predetermined viscosity in the fourth cylinder, a thrust plate and liquid distributor located in the the fourth substantially correspondingly the hemispherical member socket and lugs socket to fourth piston and bearing on the end of the fourth cylinder, sealing means at the open end of the fourth cylinder for sealing the fourth piston in the fourth cylinder and preventing the escape of said liquid, exteriorly adjustable brake means disposed in the fourth cylinder for engagement with the fourth piston, a mounting spindle fixed to the fourth cylinder and axially aligned with said fourth piston, a ball and socket type combination comprising a substantially hemispherical member concentrically mounted on the mounting spindle, a correspondingly curved concave socket, an axial hole through the socket to receive the mounting spindle with sufficient clearance to permit relative movement between the hemispherical member and the concave socket, socket engaging clamp means threaded onto said mounting spindle and lugs on the concave socket to permit it to be coupled to a supporting structure.

3. The gimbal mounting claimed in claim 2 wherein said first and second pistons each have longitudinal peripheral liquid storage depressions and an internal liquid reservoir from which liquid is distributed over the end of the piston adjacent the closed end of its associated cylinder by radial grooves extending from the reservoir to the periphery of the piston.

4. The gimbal mounting claimed in claim 2 wherein the brake means comprises a brake block slidably mounted in a bore intersecting the bore of its associated cylinder, said brake block having an arcuate peripheral depression to engage against the periphery of its associated piston, said brake block being disposed between a spring and an exteriorly accessible brake block engaging thumb screw.